Aug. 30, 1966
R. M. O'NEILL ET AL
3,270,176
IMPEDER DEVICE FOR IMPROVING RADIO-FREQUENCY INDUCTION WELDING
Filed Aug. 18, 1964
3 Sheets-Sheet 1
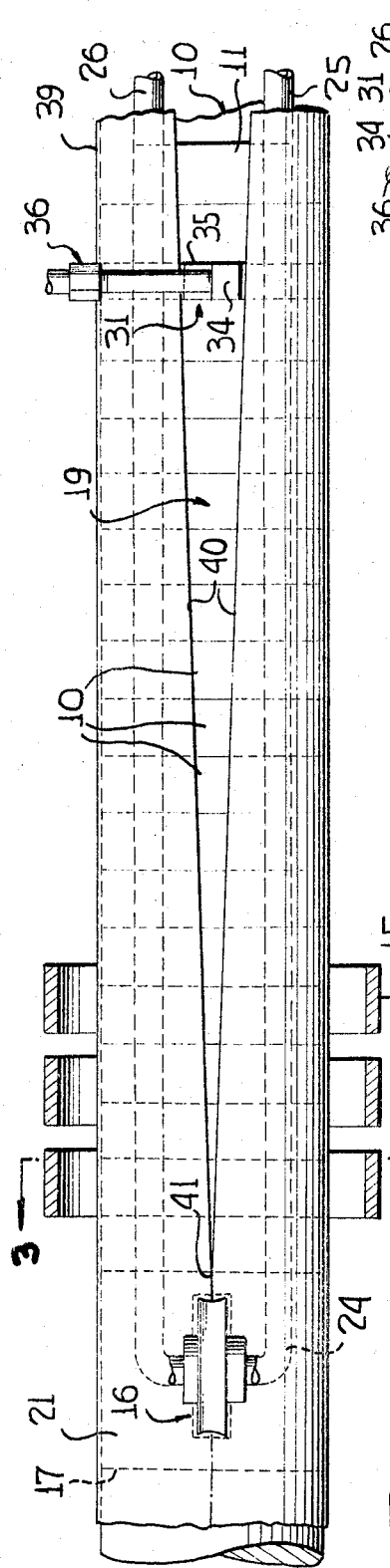
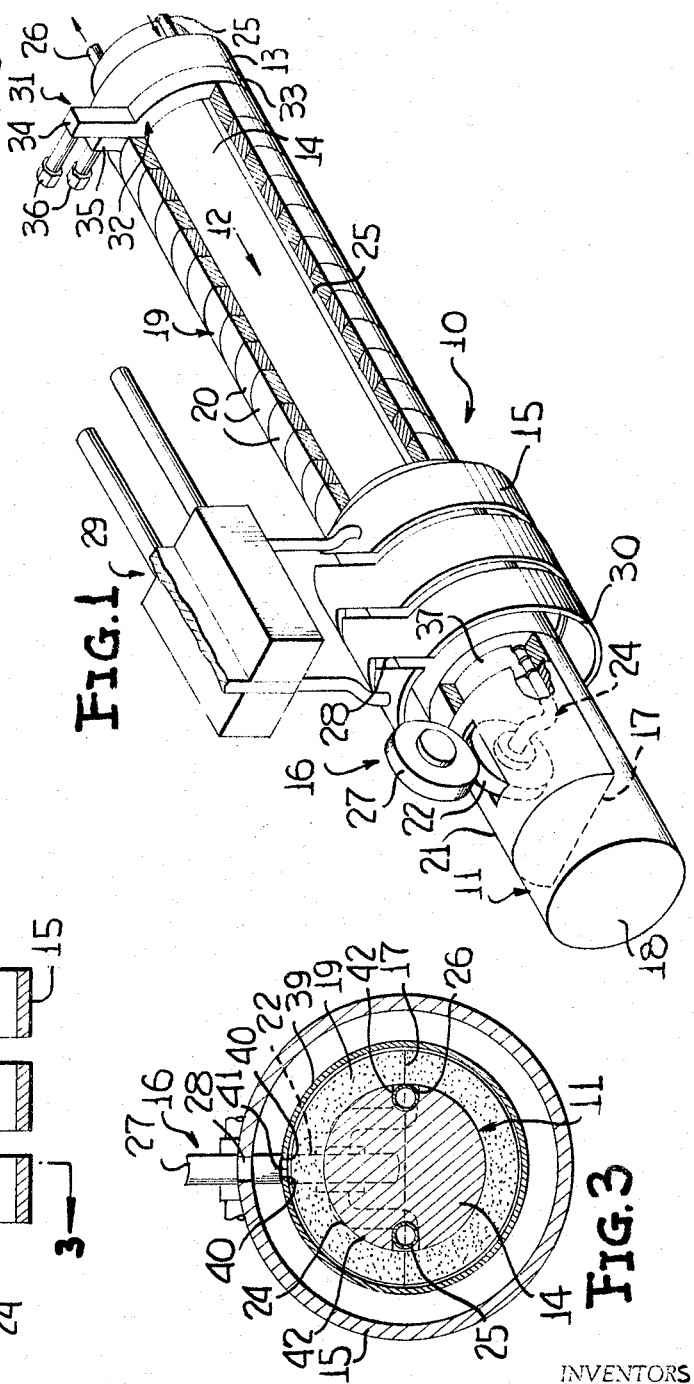
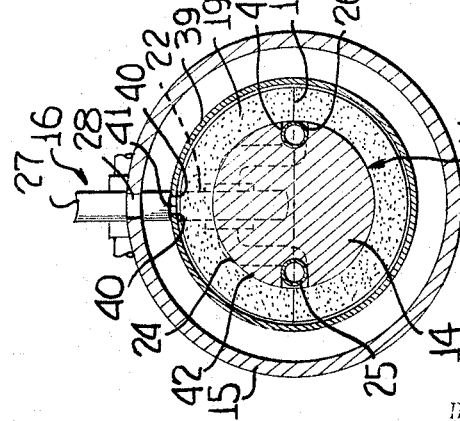
INVENTORS
ROGER M. O'NEILL
& GLENN R. MOHR
BY Mason, Porter, Diller & Stewart
ATTORNEYS

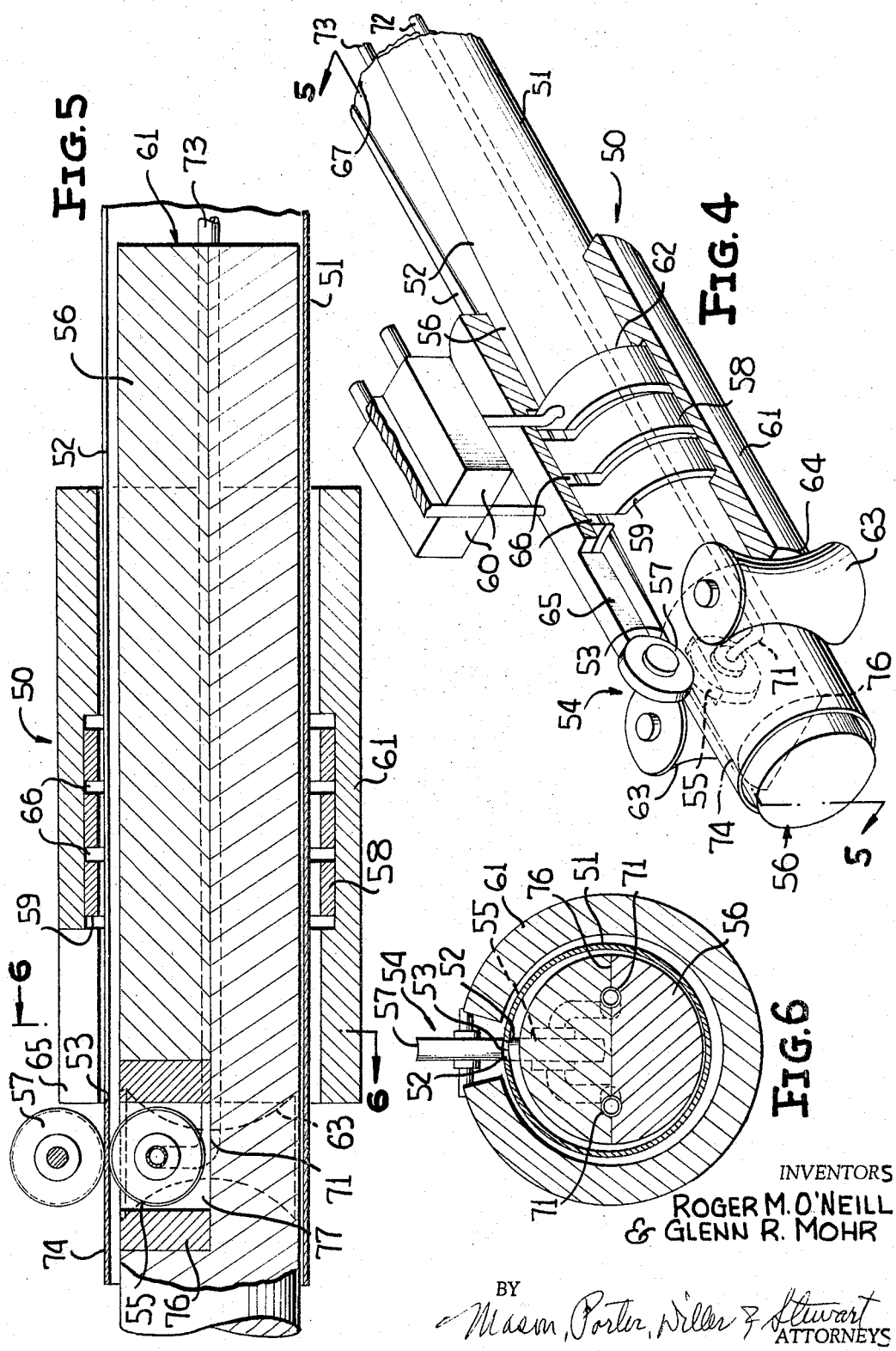

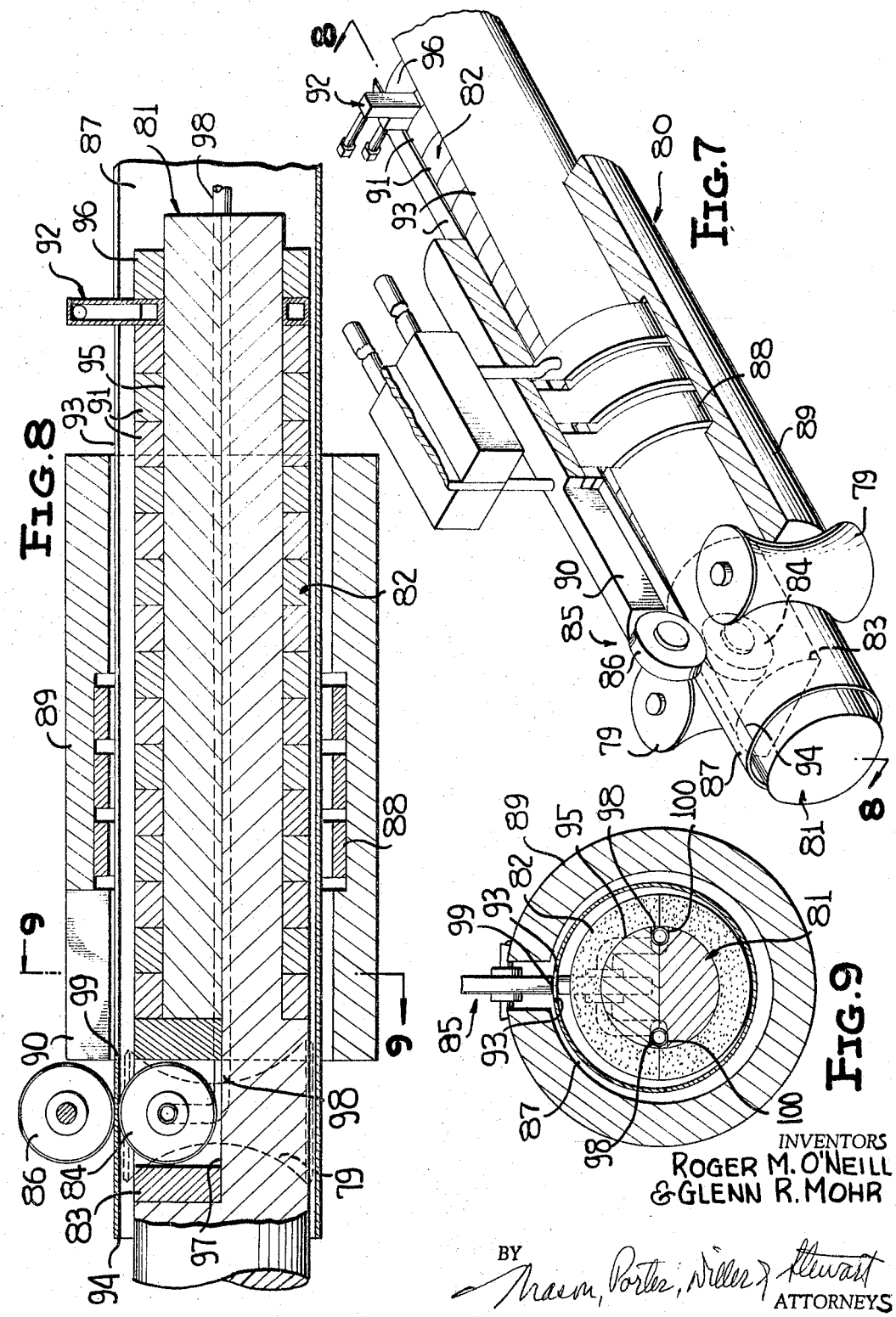

3,270,176
IMPEDER DEVICE FOR IMPROVING RADIO-FREQUENCY INDUCTION WELDING

Roger M. O'Neill, Oaklawn, Ill., and Glenn R. Mohr, Linthicum, Md., assignors to Continental Can Company, Inc., New York, N.Y., a corporation of New York
Filed Aug. 18, 1964, Ser. No. 390,785
46 Claims. (Cl. 219—8.5)

This invention relates to an improved impeder construction for increasing the efficiency and line speed for the radio-frequency welding of continuous metal strip. By the placement of ferromagnetic and/or ferrimagnetic impeder members about the radio-frequency heating means, blackplate, tinplate or aluminum stock of even light gauge may be welded. Also, by employment of the impeder construction of the present invention, the excess sidewall heating of the material being welded may be substantially reduced and the overheating of the associated welding apparatus can be reduced.

More specifically, this invention relates to construction of ferromagnetic and/or ferrimagnetic impeder members and subsequent placement thereof about and in the welding horn around which a tubular metal shape is drawn for welding. A first internal impeder sleeve is positioned about a reduced portion of the horn and on the inside of the formed tubular metal shape. Another impeder member is placed as a covering tube about the radio-frequency induction coil when such is used as the heating means. A third impeder member is placed within the welding horn and forms the housing for the lower forging roll which cooperates with the upper forging roll in forming the welding line. A magnetic field intensity terminating and heat sink block is preferably associated with the internal impeder sleeve.

The impeder construction of the present invention concentrates the magnetic flux field set up by the R.F. induction coil and thereby impedes the induced eddy current flow in sections of the tubular metal shape in which heating is not desired. By increasing the impedance of such extraneous paths, the impeder causes a concentration of the induced current in those portions of the moving tubular metal where heating is desired for attaining welding temperatures. Therewith, the excess sidewall heating of the tubular metal shape is reduced and the eddy current flow induced into the tubular formed metal for purposes of heating the edges thereof to welding temperature is caused to flow mainly on the outside surface of the metal and along the edge portions of the tubular formed strip as well as through the apex of the "V" formed by the converging edge portions.

Various metals can be welded at high speeds with the welding apparatus of the present invention. Blackplate, tinplate and aluminum and aluminum-magnesium alloys, in both light-gauge (0.002–0.004 inch thickness) and heavier gauges may be welded by lap or flap welds with increased speeds and decreased power requirements by utilizing the impeder construction of the present invention. Steel has been welded in this range down to 0.002 inch while aluminum has been down to 0.004 inch.

Solid cores of ferromagnetic material, e.g., iron cores, have been used in continuous welding lines by the prior art. The cylindrical shaped impeder member is contained within a portion of the forming horn and presents the problem of difficulty in cooling. The sidewall temperature of the welded material and the material in the horn which is in contact with the impeder members often attains extremely high temperatures indicating severe power loss. A difficulty with such arrangements is that the temperature of the impeder member is only difficulty maintained below the Curie temperature, even when a coolant is used. Above the Curie temperature the phenomena of ferromagnetism disappears and the impeder substance becomes merely paramagnetic; then acting as if it were not present. Such heating cannot be tolerated in tube welding apparatus.

Impeder members of ferrimagnetic material have been employed in various arrangements for R.F. induction coil welding but due to the limitations, such as over-heating and low machinability characteristics, the use of such impeder members has been restricted. A class of such ferrimagnetic material is that termed as ferrites which are a sintered ceramic mixture of iron oxide and various complex oxides of other metals. These materials are extremely hard and brittle and are difficult to machine into particular geometric shapes.

To overcome these difficulties, it is necessary that the impeder material have good machinability characteristics, as well as the other magnetic properties of impeder materials. Such materials must be of low electrical conductivity, high saturation flux density, high magnetic permeability and should have a high thermal conductivity and a relatively high Curie temperature. An impeder material which has all of these characteristics permits the manufacture of geometric shapes and positioning of resulting impeder members for increasing the efficiency and welding speeds of continuous welding lines.

It is, therefore, an object to provide impeder members for continuous welding line assemblies which overcome the limitations of the prior art and to enable continuous welding of tubular formed metal strip material to be utilized as an economic metal fabrication process for the production of thin walled tubular forms.

The impeder devices of the instant invention provide a low reluctance path for the leakage magnetic flux generated by the induction coil. The rapidly alternating flux produces a voltage in the impeder members which causes a current to flow. This induced current produces first, heat in the impeder and secondly produces its own field which has the effect of distorting the magnetic field of the induction coil, according to Lenz's law. For these reasons it is essential that the impeder members be constructed of a material having low electrical conductivity and high magnetic permeability.

The placement and the configuration of the instant impeder devices cooperates to limit the undesired surface current flow and thereby reduce the side wall temperatures of the tubular formed sheet material and increase the efficiency of the welding by allowing greater production rates and lower power requirements. By so spacing the impeder devices with respect to one another and with respect to the induction coil and the tubular formed sheet material, the circumferential induced current flow about the tubular formed sheet material may be controlled to flow in a well defined manner on the outside surface of the tubular formed material and to effect the heating of the edge portions of the convering "V" configuration to the necessary temperature for welding while maintaining the remainder of the tubular form at low temperatures. The outside or skin current flow is promoted by the increased impedance to flow on the inside of the tubular formed metal due to the presence of the internal impeder members.

The magnetic field generated by the induction coil causes eddy current flow in the material of the horn and/or in the material of an impeder associated with the horn if such is present. Such eddy currents establish a magnetic flux field which acts contrary to the magnetic field of the induction coil. This counter magnetic field results in the loss of effective operating power and as this effect increases, the power necessary to perform the welding of the same size strip material also increases. When such eddy currents are set up in the material of the horn, a local heating condition occurs where the impeder member joins the material of the horn. Such heating may cause a portion of the material of the impeder to exceed the Curie point with a resultant loss in the magnetic permeability of the material. In order to overcome such heating effects, a fluid cooled magnetic field intensity terminating and heat conductive block may be positioned between the material of the impeder and the material of the horn. Such a block is constructed of a material having high electrical and heat conductivities.

The RF current heating means may be either an induction coil wound about said horn and spaced therefrom or electrode welding shoes contacting the edge portions of the strip material as it passes toward the forging rolls.

It is an object of this invention to provide the improvement in a radio-frequency welding apparatus of a housing for the lower forging roll which is constructed of a material which has a high magnetic permeability and low electrical conductivity.

Another object of the present invention is to provide a covering sleeve for the induction coil which has a notch in the downstream end thereof to provide for the flow of induced eddy currents in the material being welded around the "V" of the converging edge portions. The covering sleeve is constructed of a material having high magnetic permeability and low electrical conductivity.

Yet another object of the present invention is to provide an internal impeder which is disposed as a sleeve in contact with the horn and which extends from the close proximity of the contact point of the opposite edge portions of the strip material to a point upstream at least a distance equal to the inside diameter of the coil. The internal impeder is constructed of a material having properties generally corresponding to those of the covering sleeve material.

Another object of the present invention is to provide a fluid cooled magnetic field intensity terminating and heat sink block for the upstream end of the forming horn. This terminating block is used when a short internal impeder is present. It is removable and is ring-shaped to fit the contour of the internal impeder.

The four above objects may be combined in total or in part to provide improvements in a radio-frequency welding apparatus.

In the above objects the housing for the lower forging roll may advantageously be constructed from a material consisting of powdered alpha-iron, together with a resinous binder and the covering sleeve and the internal impeder sleeve may be constructed of either a sintered ceramic ferrite or of the same material as the lower forging roll housing, while the magnetic field intensity terminating block is constructed of a material having high electrical and thermal conductivities.

The improvements in radio-frequency welding apparatus according to the present invention are adaptable to lap or blap welding lines and permit continuous operation at high speeds.

Yet another object of the present invention is to provide means whereby the sidewall heating of the tubular formed strip metal being welded may be materially reduced and whereby the heating of the forming horn by reason of the alternating magnetic field may be reduced.

In line with the above objects, the apparatus may be combined with a magnetic permeable housing for the lower of the pair of forging rolls. The material of the housing may be of a high magnetic permeability and a low electrical conductivity material and positioned wholly within the horn. The material of this housing may be cooled by a cooling fluid which is forced through fluid conduits located within or on the horn.

The improved power efficiency and speed of welding effected by the present invention may be particularly effected by combining the magnetic permeable bottom forging roll housing with the covering tube for the induction coil and the internal impeder positioned in contact with the configured horn and having the magnetic field intensity terminating and heat sink block in contact with the upstream end thereof. The improved power efficiency and higher speeds of welding are permitted due to the lower power loss due to unnecessary sidewall heating of the tubular formed metal strip and of the forming horn itself. The sidewall temperature may be materially reduced according to the present invention.

Other objects of the novel radio-frequency induction welding apparatus of the present invention will become evident and will be more readily understood by the following description and claims taken in conjunction with the accompanying drawings, in which:

FIGURE 1 is a perspective view of the induction welding apparatus wherein the internal impeder is shown by the removal of a section thereof about the horn.

FIGURE 2 shows a top plan view of the apparatus of FIGURE 1 in which the induction coil is shown in cross sectional view and in which the tubular formed strip material is being fed over the horn and between the forging rolls.

FIGURE 3 shows a cross sectional view of the apparatus of FIGURE 1 taken on the line 3—3 of FIGURE 2.

FIGURE 4 is a perspective view of a modification of the radio-frequency welding apparatus of the present invention in which an external covering tube of a material having a high magnetic permeability is shown surrounding the induction coil and having a notch in the downstream end thereof and in which the material of the external covering tube is shown in partial section and wherein the tubular formed strip material is shown positioned over said horn and between the forging rolls.

FIGURE 5 is a longitudinal cross sectional view of the apparatus of FIGURE 4 taken on the line 5—5 thereof with a portion of the horn shown in plan view.

FIGURE 6 shows a transverse cross sectional view of the welding apparatus of FIGURE 4 taken on the line 6—6 of FIGURE 5 while omitting the hourglass rolls of FIGURES 4 and 5.

FIGURE 7 shows a perspective view of another modification of the present invention in which both internal and external impeder members are shown, the internal impeder being shown between the edges of the converging "V" configuration and the external impeder being shown in partial section.

FIGURE 8 shows a longitudinal cross sectional view of the apparatus of FIGURE 7 taken on the line 8—8 thereof and in which a portion of the horn has been shown in plan view.

FIGURE 9 shows a transverse cross sectional view of the apparatus of FIGURE 7 taken on the line 9—9 of FIGURE 8 while omitting the hourglass rolls of FIGURES 7 and 8.

Referring now to FIGURE 1, the radio-frequency welding apparatus 10 has a horn 11 about which a continuous strip of metal is formed into a tubular shape and fed in the direction of arrow 12 in order to continuously weld the opposite edge portions. Horn 11 has an enlarged upstream end 13 and a reduced tubular main portion 14 which extends from a point upstream of the associated induction coil 15 to within the proximity of the contact of forging rolls 16. A recessed portion 17 is provided in the horn over which the forging rolls 16 are rotated. The downstream end 18 of horn 11 is that of conventional tube welding horns.

The impeder devices of the present invention consist of a sleeve 19 of a material having high magnetic permeability and low electrical conductivity. This impeder sleeve 19 consists of, in the preferred embodiment, a series of ring-shaped elements 20 in abutting relationship and spaced along the reduced portion 14 of horn 11. Another optional, but preferred, impeder device is impeder housing 21 which is set within the recess 17 at the downstream end of horn 11. Impeder housing 21 serves as a support and container for the bottom forging roll 22 and conforms to the circular cross section of horn 11 by having an arcuate top portion 23.

Bottom forging roll 22 and the impeder housing 21 are cooled by a coolant fluid forced through fluid conduit 24 which has an entry conduit 25 spaced within or on the surface of horn 11 and can be seen on the surface of the reduced portion 14 by the cutaway view of the impeder sleeve 19. An exit conduit of a similar nature conducts the cooling fluid away from forging roll 22 and impeder housing 21. Exit conduit 26 is shown in opposing diametrical position from entry conduit 25. These fluid conduits also remove some of the heat generated in impeder sleeve 19.

An associating cooperating forging roll 27 is located in opposing relationship to bottom forging roll 22 and is rotatably retained in associated structural members (not shown).

The induction coil 15 consists of three loops of conductor having a diagonal configuration 28 therein immediately over the "V" configuration formed by the converging edge portions of the strip material (best shown in FIGURE 2). A pair of current conductors 29 are shown leading from a generating source for the radio-frequency current (not shown) and connected to opposite ends of induction coil 15.

The coil 15 is disposed about the outside of horn 11 a sufficient distance to provide clearance for the movement of the strip material which is to be welded by apparatus 10. The downstream edge 30 of induction coil 15 lies in a plane which is substantially perpendicular to the longitudinal axis of horn 11. This plane intersects the converging "V" configuration formed by the tubular shaped strip material being welded in the near proximity of the apex thereof. The induction coil 15 extends upstream a distance sufficient to create enough heat in the edge portions of the metal strip to weld the same one to another when the particular impeder devices of the present invention are employed.

At the upstream end of horn 11 and furnishing an upstream abutment for the upstream end of impeder sleeve 19 is a ring-shaped magnetic field intensity terminator and heat sink block 31 which consists of a conduit 32 of angular cross section, preferably square in dimension, formed in the shape of a ring 33 for contacting by its inner sides thereof the reduced portion 14 of horn 11. The conduit 32 is formed by having upstanding entry port 34 and upstanding exit port 35 which are both fitted with fluid coupling connections 36 which are in turn connected to a continuous flowing source of coolant liquid. The material of construction for conduit 32 and terminator block 31 is copper or a copper alloy having a high copper content. Copper alloys having particular non-corrosive properties with respect to the coolant fluid employed are, of course, preferred.

The magnetic field intensity terminating and heat sink block 31 serves two independent functions. The first function is to provide electromagnetic shielding for the enlarged upstream end 13 of forming horn 11. By constructing this field intensity terminating and heat sink block 31 from a material which has high electrical conductivity, the eddy currents which are induced in the material by the alternating magnetic field terminate the magnetic field. The low resistance of the metal to eddy current flow allows such current to readily flow and, thus, set up a counter-magnetic field, according to Lenz's law. This eddy current flow produces heat which is removed by the coolant forced through the interior of the heat sink block 31. By constructing the heat sink and field terminating block 31 of a material which has very low resistance, such a copper or copper alloys, the eddy currents produced and, therefore, the resultant counter-magnetic fields are sufficient to terminate the field almost completely and the shielding is practically complete.

By terminating the magnetic field intensity in the block 31, the magnetic induction or the magnetic flux does not penetrate substantially into the metal of enlarged end 13 and, therefore, the same is not heated to an uncontrollable temperature. The thickness of the terminator member should be great enough to reduce the magnetic field intensity to a very low value by reason of the shielding or "skin effect."

The second function of block 31 is to "insulate" the upstream end of impeder sleeve 19 and particularly the enlarged portion 13. By interposing a heat sink block between the enlarged end 13 and the impeder sleeve 19, any heat generated in the horn is not transmitted through to the impeder sleeve which is more difficultly cooled. Such cooling avoids the local overheating condition which normally occurs between the impeder sleeve 19 and the surrounding end portion 13 of the forming horn. The cooling by the heat sink block 31 also reduces the temperature of the upstream end of impeder sleeve 19 so that the Curie temperature is not exceeded, and thereby the ferromagnetic or ferrimagnetic properties of the impeder material are retained. Materials which are useful as impeders are characterized by high resistivity to electric current flow and to heat flow. While the latter resistivity is not desired, it is usually associated with impeder materials provisions. Notwithstanding this high current resistivity, there is considerable eddy current flow in the impeder sleeve which serves to heat the same and such temperature must be controlled.

Such eddy currents as are induced by the induction coil 15 in the material of the impeder sleeve cause power loss which reduces the efficiency of the welding operation. The high resistance to electrical flow limits the power loss which would occur with use of a lower resistance material. The low thermal conductivity makes heat extraction from the impeder sleeve difficult and, therefore, the heat sink block 31 at the upstream end of impeder sleeve 19, reduced portion 14 of the horn 11 and fluid conduit tubes with exits at 25 and 26 allow controlling of the local overheating condition which might otherwise cause the material of the impeder sleeve to exceed the Curie point of about 350–360° F.

Flux terminator and heat sink block 31 need not be present if the upstream end of sleeve impeder 19 is far removed from the upstream edge of coil 15 because of the diminished magnetic field intensity at this point. A convenient measure of spacing is the induction coil inside diameter. When the upstream end of the sleeve impeder is about 5 or more coil diameters from the closest end of the heating coil, no heat sink block is required.

Such a flux terminator is preferred for spacing factors of from one to five coil diameters and has been found essential when an upstream spacing approximately equal to the coil diameter is employed.

The material of construction for impeder sleeve 19 must be of high magnetic permeability, low electrical conductivity. A suitable construction material is a ferrimagnetic substance known as ferrite. This material is a ceramic substance which is formed by sintering mixtures of iron oxide and complex oxides of other metals. These sintered oxides have low electrical conductivity and low thermal conductivity and are characterized by poor machinability characteristics. Therefore, where such a ferrimagnetic substance is useful and can be obtained in standard shapes, such as torodial shaped ring sections 20, it is useful. Another material which is useful for the impeder sleeve 19 and has a higher coefficient of heat transfer is a ferromagnetic material resulting from mixing fine powdered alpha-iron with resinous binding substances above the flow point of the latter. Such substances may be compounded at various proportions of iron to resinous binder and specifically proportions of 5:1 to 10:1, respectively, have been found useable. The electrical resistivity of such material is low due to the fact that the iron particles are separated from one another by the continuous matrix of the binder. Polyester resins are a preferred resinous material.

The material of construction of impeder housing 21 for the lower forging roll 22 must also have high magnetic permeability. Due to the particular geometric shape of housing 21, the material is preferably characterized by good machinability. The casting of ferrite or ferrimagnetic materials into accurate geometric shapes is complicated by technical difficulties and once sintered are very difficultly cut and machined into shape, such as that required by housing 21.

It is preferable to machine the impeder material into the specific shape required from a substance which will retain accurate dimensional tolerances in order to support the rotation of lower forging roll 22. A ferromagnetic material having good machinability has been discovered to be the above-mentioned powdered alpha-iron mixture with a polyester binding resin in the approximate weight proportion of 5:1 to 10:1. At the lower proportion of powdered iron, the ferromagnetic material resulting shows extremely good casting properties and may be cast into prepared molds of the desired geometric shape. At the higher proportion of powdered iron a material is presented which is useful for die pressing techniques for which 4 to 10 ton casting presses can be employed.

A suitable iron powder for the above ferromagnetic material is either water-atomized iron or carbonyl processed iron, both being extremely small particle size and characterized by a predominant percentage of alpha-iron. The particle size range is extremely small and varies from several microns to 100 microns size diameters with an average of 44 microns diameter.

Various polyester resins have been utilized for this material. Other resinous binders are useful as long as the melting point is high, e.g., 100° C. As most thermoplastic materials have melting points above this temperature range, many such polymers and copolymers can be employed as the continuous phase of the ferromagnetic material. A suitable polyester resin can be obtained from Cadillac Plastic Company under trade designation No. MR 37CX.

If a horn is used in apparatus 10 which has no impeders associated therewith, a 60# tinplate strip (0.0066 inch thick) may be welded with a ⅜ inch gap between the strip and the induction coil 15 with a resultant sidewall temperature therein of 275–325° F. The material of construction for such a horn is of stainless steel as is conventional.

By employing the impeder sleeve 19 and the impeder housing 21 located in the specially configured stainless steel forming horn 11, in accordance with the present invention, an efficiency of 2.5 times that of the above example, using the same ⅜ inch gap between the strip material and the induction coil 15 may be attained. In addition, the sidewall temperature may be reduced to 150–180° F. which makes evident the lower power input to the induction coil 15 which is necessitated by reason of the impeders of the present invention.

The cross sectional area of impeder sleeve 19, taken on a transverse plane extending perpendicular from the longitudinal horn axis should be approximately 0.575 of the enclosed cross-sectional area of the tubular formed strip material for a welding speed of 210 feet per minute in 60# tinplate. This preferred relationship may be altered in order to increase the cross sectional area of the impeder sleeve to raise the above fraction closer to unity, to permit higher welding speeds. The dimensions of a tested horn 11 having an impeder sleeve 19 thereon and an impeder housing 21 set therein are the following: the impeder sleeve was 10½ inches in length and the toroidal shaped ring sections 20 had the dimensions of 2⅜ inches O.D. and 1⅜ inches I.D. The impeder sleeve extended from near the point of contact or the apex of the "V" configuration of the tubular formed material to a substantial distance upstream thereof. A cutaway portion 37 is shown near the apex position and has been taken by removing a quarter-section of a ring impeder 20.

The welding speeds attainable on 60# tinplate by the use of welding apparatus 10 are as high as 210 feet per minute based on a maximum impeder sleeve diameter of 2⅜ inches to allow for the 2.571 plug diameter tubular form and a minimum cut-out for the diameter of the reduced horn portion 14 of 1⅜ inches. This welding speed may be increased somewhat by increasing the cross sectional area of the impeder sleeve and by increasing the conduction cooling by reason of the terminator block 31 and fluid conduit 24.

FIGURE 2 shows welding apparatus 10 with a tubular formed strip of metal positioned thereabout for contacting the opposite edge portions thereof and for forging the contacted edge portions between the pair of forging rolls 16 to form a line of weld 38. This line of weld may be either a lap or a blap depending upon the extent of overlap and the control over the position of the opposite edge portions. Tubular formed strip material 39 is shown forming a converging "V" configuration 40 having a point of contact of the edge portions thereof at a point 41 immediately upstream of forging rolls 16. The three loops of induction coil 15 are shown in cross-sectional view disposed about the tubular formed strip material 39 over the "V" configuration immediately upstream of the point of contact 41.

Recess 17 is shown housing impeder housing 21 in which fluid conduit 24 is disposed for cooling the impeder housing and the lower forging roll 22 (seen in FIGURE 1). Horn 11 is shown having entry fluid conduit 25 and exit fluid conduit 26 extending from the upstream end thereof. Terminator block 31 is shown in top plan view with fluid coupling 36 shown connected to intake port 34. Although the edges of tubular formed metal strip 39 are shown in close proximity to upwardly extending ports 34 and 35, there is no contact therewith as these ports are constructed of a material such as copper or copper alloys which would be degraded by such contact.

Impeder sleeve 19 composed of impeder rings 20 is shown extending from approximately the point of contact of the edge portions 41 downstream to abutting relationship with the magnetic field intensity terminating and heat sink block 31 at the upstream end.

Referring now to FIGURE 3, the cross sectional view taken on the lines 3—3 of FIGURE 2 shows the cooperation of forging rolls 16 with respect to the tubular formed metal strip 39. Edge portions 40 are shown entering under the cooperative forging roll 27 and on top of bottom forging roll 22. The bottom forging roll is shown located in recess 17 in the configured horn 11 in which impeder housing 21 is located. Point of contact of the edge portions 40 is shown at 41 as in FIGURE 2.

The relationship of the cross sectional area of impeder sleeve 19 to the cross sectional area enclosed by the tubular configured strip material 39 can be seen in FIGURE 3.

Fluid conduit 25 and the corresponding exit conduit 26 can be seen located in groove 42 in the outside surface of reduced portion 14 of horn 11. These conduits are connected by conduit 24 which removes heat generated in the forging roll housing impeder.

Surrounding the tubular formed strip material 39 is the downstream loop of induction coil 15 with a space 28 shown therein located immediately over the converging "V" configuration formed by the metal edge portions.

Referring now to FIGURE 4, a welding apparatus 50 is shown for continuously welding a tubular formed strip of metal 51 which may be steel, tinplate or aluminum and may range in thickness from 0.0066 inch in thickness or several thousandths of an inch thinner to thicker stock. As tubular form 51 is formed within the apparatus 50, opposite edge portions 52 form a converging "V" configuration which has the apex thereof located at a point 53 immediately upstream of the pair of forging rolls 54. The bottom forging roll 55 is located in a standard tubular welding horn 56 and cooperates with top forging roll 57 to forge a line of either lap or blap weld between the opposite edge portions 52. The material 51 is continuously fed downstream with respect to fixed horn 56 and between forging rolls 55 and 57. Horn 56 may be constructed of stainless steel or an insulator such as Fiberglas.

Upper forge roll 57 is housed rotatably and associated structure fixed with respect to horn 56 (not shown in FIGURE 4).

A three loop radio-frequency induction coil 58 is shown disposed about the outside of tubular form 51 and spaced out of contact therewith. The downstream edge of the downstream loop 59 lies in a perpendicular plane passing through the longitudinal axis of horn 56. The plane formed by the edge 59 passes through the tubular form 51 in the close proximity of point 53 which is the apex of the "V" configuration formed by the welding material. A pair of radio-frequency current electrodes 60 are connected to opposite ends of induction coil 58 and are in turn connected to a source of radio-frequency current (not shown).

Disposed about the outside portion of induction coil 58 and spaced out of contact with moving tubular form 51 is a covering tube 61 constructed of a material having a high magnetic permeability and a low electrical conductivity. Tube 61 extends from a point upstream located approximately the diameter of the induction coil 58 from the upstream edge 62 of the induction coil. The covering tube extends over the entire external portion of induction coil 58 and extends downstream to a close spacing from conventional hourglass rolls 63. In practice the downstream end 64 of the tube is about 1½ inch from the apex of the "V." The tube has therein at the upper side a notch 65 for accommodating the flow of induced eddy currents about the "V."

Covering tube 61 may be constructed of a sintered ceramic ferrite such as that set out for toroidal rings 20 of impeder sleeve 19 in FIGURE 1 or may be constructed of a more easily machinable material such as the ferromagnetic material described above for the construction of lower forging roll housing 21, of FIGURE 1. Both materials provide good magnetic permeability and low electrical conductivity.

The induction coil 58 is formed with diagonal contours 66 located therein over the path of the converging "V" configuration formed by metal edge portions 52.

There is no magnetic field intensity terminating and heat sink block shown in FIGURE 4. This element of the welding apparatus shown as heat sink block 31 of FIGURE 1 is not necessary to the apparatus shown in FIGURES 4–6. In those figures there is no internally positioned impeder sleeve surrounding the forming horn, therewith, there is no local heating caused by the eddy current flow produced by high flux densities when such an impeder is present. The material of the forming horn is of low permeability, generally being paramagnetic and, thus, does not have high flux density which would produce the heat generating eddy currents. The magnetic flux is greatly reduced at a point upstream as far removed from induction coil 58 as the end portion 67 of tube 61.

A fluid conduit 71 is shown for cooling lower forging roll 55 and conducts a coolant fluid through entry conduit 72 and out exit conduit 73. These conduits also help to remove heat generated in welding horn 56.

The line of weld 74 forged by opposing and cooperating forging rolls 54 is shown at the downstream end of apparatus 50.

The preferred thickness of the ferrimagnetic material of covering tube 61 over the induction coil 58 is ⅜ to ½ inch and the covering tube 61 may preferably have an inside diameter equal to the inside diameter of induction coil 58.

The placement of covering tube 61 about the induction coil 58 in the manner shown has been found to increase power efficiency by approximately 10 percent and to reduce the sidewall heating of tubular form 51 appreciably.

The longitudinal cross sectional view of apparatus 50 shown in FIGURE 5 shows the apparatus substantially as described and shown in FIGURE 4 in which induction coil 58 is disposed about and out of contact with tubular form 51 and has disposed thereabout for a distance upstream and downstream thereof a covering tube 61 which is formed with a notch 65 in the downstream end thereof to accommodate or allow eddy current flow to heat the edge portions or margins of the vertical edges 52 to form a line of weld 74 which may be a lap or a blap weld line. The notch 65 extends forward from the downstream edge 59 of coil 58 to the vicinity of upper forging roll 57. The point of contact of the metal edge portions 52 is shown at point 53 as described in FIGURE 4.

Exit conduit port 73 may be seen extending outwardly from fluid coolant conduit 71 passing from the downstream portion of horn 56 to the upstream end thereof. The fluid line 71 serves to cool bottom forging roll 55 and its associated housing 76, as well as the horn 56. The housing 76 is located in a recessed portion 77 cut into the downstream end of horn 56. The outside surface of the housing 76 is arcuately configured to conform to the circular cross section of horn 56. The material of impeder housing 76 may be a ferromagnetic material exhibiting a high magnetic permeability as well as low electrical conductivity properties, such as described for housing 21 of FIGURE 1; or may be of the same material as horn 56. The coolant fluid in conduit 71 serves to cool the housing 21, the forging roll 55 located therein and the tubular horn 56.

The impeder material of covering tube 61 together with a ferromagnetic material for impeder housing 76 cooperate to concentrate the lines of magnetic flux generated by induction coil 58 in the vicinity of the metal edge portions 52 and in particular in the vicinity of the contact point 53. Notch 65 is provided in covering tube 61 for allowing the establishment of current flow paths around the "V." If the impeder tube 61 were continuous over the "V," the impedance to current flow around the "V" would be increased considerably which would make welding more difficult.

FIGURE 6 shows the covering tube 61 disposed about tubular form 51. The bottom forging roll 55 and top forging roll 57 are shown engaging the bottom and upper surfaces of the tubular form 51.

Horn 56 is shown with the fluid conduit 71 located therein and serving to cool the material of the impeder housing 76 (shown by dotted lines) which rotatably houses lower forging roll 55.

FIGURE 7 shows a tube welding apparatus 80 which has associated with horn 81 which is of a specially configured nature, two internally spaced impeder members. The first of the impeder members is an impeder sleeve 82 corresponding to impeder sleeve 19 of FIGURE 1. The second of the impeder members is an impeder housing 83 shown in dotted lines which constitutes the housing for lower forging roll 84 of forging roll pair 85. A corresponding top forging roll 86 is shown in rotating engagement with the continuously fed tubular form 87.

An external impeder member is shown surrounding induction coil 88 and extending upstream and downstream therefrom. This impeder member is covering tube 89 which extends from a point upstream approximately a distance equal to the internal diameter of induction coil 88 downstream past the induction coil to within a close spacing to hourglass rolls 79. This covering tube has a notch 90 formed in the downstream end thereof corresponding to notch 65 of FIGURES 4–6 to allow flow of induced eddy currents around the "V." Conventional roll pair 85 is shown as in FIGURE 4.

By apparatus 80 an efficiency in excess of 2.5 times that for a similarly constructed tubular welding apparatus having no impeder members associated therewith can be attained. Also, the sidewall heating of the tubular form 87 may be reduced to between 20 and 60° F.

above ambient temperature which is a substantial and important reduction in the temperature normally associated with induction tubular welding apparatus.

The remainder of apparatus 80 is substantially similar to the apparatus described in FIGURES 1 and 4 description. The impeder sleeve 82 consists of a plurality of ferrimagnetic impeder rings 91 which are located on a reduced portion of horn 81 and abut against a magnetic field intensity terminating and heat sink block 92 which has been described in FIGURE 1 as terminator block 31. The impeder rings 91 and the terminating block 92 are removable from forming horn 81 and are held in place at the upstream end thereof by collar 96. This removable feature of the individual rings 91 allows the impeder material extending upstream according to design specifications.

The material of impeder sleeve 82 is the same as impeder sleeve 19 of FIGURE 1 and the material of construction of impeder housing 83 is the same material of construction as of the similar impeder housing 21 of FIGURE 1.

The material of construction of covering tube 89 is the same as the material used in the construction of tube covering 61 of FIGURE 4.

The opposing forging rolls act on the converged edge portions 93 of tubular form 87 to produce a line of weld 94 similar to the weld lines of the apparatus of FIGURES 1 and 4.

FIGURE 8 shows in cross sectional view all of the novel impeder devices and the terminator block 92 of FIGURE 7. The first of the internal impeder members is impeder sleeve 82 positioned about reduced diameter 95 of horn 81. The upstream end of impeder sleeve 82 abuts against terminating block 92 which is retained in contact therewith by a collar 96 and is adapted to be fluid cooled as is the terminating block of FIGURES 1–3. The preferential presence of the terminating block 92 is controlled by the same factors as described for FIGURE 1. The individual impeder rings 91 allow for ease of construction and replacement maintenance in constituting the impeder sleeve 82 as well as give an element of control over the length of impeder sleeve 82 which may be desired for various purposes. The second internal impeder device is lower forging roll housing 83 which is shown positioned in a recess 97 in the downstream end of horn 81.

The cooling means of the lower forging roll 84 and associated impeder housing 83 is a fluid coolant conduit 98 located in or on the surface of horn 81 or in grooves on the surface thereof. This conduit 98 also removes heat generated in impeder sleeve 82.

Induction coil 88 is shown disposed about and out of contact with tubular form 87 and has disposed thereabout covering tube 89 which is shown extending upstream a distance approximately equal to the diameter of induction coil 88 and extending downstream past the end of the coil with a notch 90 therein for accommodating eddy current flow around the "V" apex 99.

The volume of material of the three impeder devices of apparatus 80 and their respective positions is sufficient to greatly reduce the eddy current flow in undesired paths within and on the surfaces of tubular form 87. These concentrate the induced current paths in the outer skin surface of tubular form 87 in order to effect an accurate weld line 94. Impedance to eddy current flow through the apex 99 of the "V" is aided by reason of notch 90 in covering tube 89 which lowers the impedance of the current flow paths in converging edge portions 93.

FIGURE 9 shows in transverse cross section a relationship of the external impeder, covering tube 89 and one of the internal impeders, impeder sleeve 82. The tubular form 87 is shown converging to point 99 and is spaced about the outside of impeder sleeve 82 and horn 81. The coolant liquid conduit 98 is shown in grooves 100 positioned in the surfaces of the reduced portion 95 of tube horn 81.

The pair of forging rolls 85 are shown forging a line of weld downstream of the point of contact 99.

By employing the tubular welding apparatus 80 as described in the description of FIGURES 7–9, the upstream temperature of horn 81 may be limited to between 150–200° F. and the sidewall heating of tubular form 87 may be limited to as low as 20–60° F. above ambient temperature while the efficiency of welding may be increased greater than 2.5 times that of tubular welding apparatus containing no impeder members. The welding speed on the apparatus described and shown by FIGURES 7–9 has been in excess of 210 feet per minute.

By employing the three impeders, two internal impeders and one external, and by employing the magnetic field intensity terminating and heat sink block 92, the heating of the upstream end of horn 81 and the excess heating of the sidewall of the tubular form metal strip 87 may be substantially lowered. The termination of the magnetic field intensity generated by induction coil 88 minimizes the local overheating problems in the upstream end of horn 81. By so terminating the field intensity, the heat generated in this horn is reduced and the problem of exceeding the Curie temperature of the impeder material is avoided.

For efficient radio-frequency induction welding the current flow should be on the surface of the material which is to be welded. Current flow on the interior surfaces of the tubular form strip material does not heat the edge portions which are being welded when a blap type weld is being made. Additionally, such currents as are established on the interior of the tubular form results in a high power loss which severely limits power efficiency attainable by the use of such welding apparatus and oftentimes amounts to an uncontrollable power loss; varying between extreme limits. By the present invention the majority of the induced current paths in the tubular form metal strip flow on the outer surface of the tubular form due to the increased impedance created by the internal impeder to such inside current flow. For steel or tinplate at temperatures below the Curie temperature, with radio-frequency welding at 450 kc./p.s., the skin depth of current travel is less than 0.001 inch and, thus, the current flow is limited to the immediate area of the outside surface of the tubular form strip which is to be welded.

It is obvious that the illustrative practices are not restricted; and that the invention may be practiced in many ways within the scope of the appended claimed subject matter; and in particular, any combination of the impeder devices described may be employed. That is, any two of the impeder devices may be eliminated and the single impeder device used in conjunction with the remaining apparatus and the terminating block at the upstream end of the horn may be present or absent depending upon the particular welding to be carried out.

We claim:

1. In a radio-frequency welding apparatus having an induction coil and a horn about which opposite edge portions of continuous strip material are positioned for welding one to another and for supporting the first of a pair of forging rolls, the improvement comprising a housing for said first forging roll constructed of a material having a high magnetic permeability and low electrical conductivity.

2. The improvement in a radio-frequency welding apparatus of claim 1 in which the material of said housing is a mixture of powdered alpha-iron and a polyester resin in the weight ratio range of 5:1 to 10:1.

3. In a radio-frequency welding apparatus having an induction coil and a horn about which opposite edge portions of continuous strip material are positioned for welding one to another and for supporting the first of a pair of forging rolls and having a second cooperating forging roll for contacting the outer surface of the strip material and for acting together with said first forging roll to forge a line of weld, the improvement comprising an impeder sleeve of a material having a high magnetic permeability and low electrical conductivity disposed about said horn and in contact therewith and extending from a perpendicular plane in close proximity to the point of contact of the edge portions of the formed strip material to a plane spaced upstream from said coil a distance greater than the inside diameter of said coil.

4. The improvement in a radio-frequency welding apparatus of claim 3 in which said impeder sleeve is constructed of a sintered ceramic ferrite.

5. In a radio-frequency welding apparatus having an induction coil and a horn about which opposite edge portions of continuous strip material are positioned for welding one to another and for supporting the first of a pair of forging rolls and having a second cooperating forging roll for contacting the outer surface of the strip material and for acting together with said first roll to forge a line of weld; the improvement comprising a covering tube of a material having high magnetic permeability and low electrical conductivity disposed about said induction coil, said tube extending from a position close to the "V" of the opposite edge portions to a plane on the upstream side of said induction coil, and said tube having a notch therein for accommodating induced current flow around the "V."

6. The improvement in a radio-frequency welding apparatus of claim 5 in which said covering tube is constructed of a sintered ceramic ferrite having high magnetic permeability and low electrical conductivity.

7. In a radio-frequency welding apparatus having an induction coil and a horn about which opposite edge portions of continuous strip material are positioned for welding one to another and for supporting the first of a pair of forging rolls, and having a second cooperating forging roll for contacting the outer surface of the strip material and for acting together with said first forging roll to forge a lap or blap weld line, the improvement comprising a covering tube of a material having high magnetic permeability and low electrical conductivity disposed about said induction coil, said tube extending from a position close to the "V" of the opposite edge portions to a plane on the upstream side of said induction coil, and said tube having a notch therein for accommodating induced eddy current flow around the "V."

8. The improvement in a radio-frequency welding apparatus of claim 7 in which said covering tube is constructed of a sintered ceramic ferrite.

9. In a radio-frequency welding apparatus having an induction coil, a horn about which opposite edge portions of continuous strip material are positioned for welding one to another, and an impeder sleeve disposed about said horn and in contact therewith and extending from a plane in close proximity to the point of contact of the edge portions of the formed strip material to a plane spaced upstream from said coil at least a distance equal to the inside diameter of said coil, the improvement comprising a removable magnetic field intensity terminating block formed in a ring-shaped fluid conduit disposed about a reduced diameter portion of said horn, and in contact with the upstream end of said impeder sleeve, and said terminating block adapted to be fluid cooled and constructed of a material having high thermal and electrical conductivities.

10. The improvement in a radio-frequency welding apparatus of claim 9 in which said terminating block is constructed of a copper alloy having high copper content.

11. In a radio-frequency welding apparatus having an induction coil and a horn about which opposite edge portions of continuous strip material are positioned for welding one to an other and for supporting the bottom roll of a pair of forging rolls, the improvement comprising an impeder sleeve of a material having high magnetic permeability and low electrical conductivity disposed around said horn and supported contact therewith, said impeder sleeve extending from a distance greater than one coil diameter upstream of said induction coil downstream to a perpendicular plane in close proximity to the contact point of the converging edge portions of the strip material, and a housing for said first forging roll constructed of a material having a high magnetic permeability and low electrical conductivity and said housing located wholly within said horn.

12. The improvement in a ratio-frequency welding apparatus of claim 11 in which said impeder sleeve is constructed of a sintered ceramic ferrite and in which said housing for said first forging roll is constructed of a mixture of powered iron and a polyester resin in the weight ratio range of 5:1 to 10:1.

13. In a radio-frequency welding apparatus having an induction coil and a horn about which opposite edge portions of continuous strip material are positioned one to another and for supporting the first of a pair of forging rolls, a first forging roll in said horn and a second cooperating forging roll for contacting the outer surface of the strip material and for acting together with said first roll as a forging roll pair to forge a line of weld, the improvement comprising a covering tube of a material having high magnetic permeability and low electrical conductivity disposed about said induction coil, said covering tube extending from a position immediately upstream from said forging roll to a plane on the upstream side of said induction coil, said tube having a notch therein at the downstream end for accommodating induced current flow in the edge portions and a housing for rotatably retaining said first forging roll constructed of a material having a high magnetic permeability and low electrical conductivity and said housing located wholly within said horn.

14. The improvement in a radio-frequency welding apparatus of claim 13 in which said covering tube is constructed of a sintered ceramic ferrite.

15. In a ratio-frequency welding apparatus having an induction coil, a horn about which opposite edge portions of continuous strip material are positioned for welding one to another and for supporting the first of a pair of forging rolls, and an impeder sleeve disposed about said horn and in contact therewith and extending from a plane in close proximity to the point of contact of the edge portions of the formed strip material to a plane spaced upstream from said coil at least a distance equal to the inside diameter of said coil, the improvement comprising a housing for said first forging roll constructed of a material having a high magnetic permeability and low electrical conductivity, and a fluid cooled magnetic field intensity terminating block positioned at the upstream end of said impeder sleeve, said block constructed of a material having high thermal and electrical conductivities and a low magnetic permeability.

16. The improvement in a radio-frequency welding apparatus of claim 15 in which the material of said housing is a mixture of powered iron and resinus binder in the weight ratio range of 5:1 to 10:1 and in which said magnetic field intensity terminating block material is a copper alloy having a high copper content.

17. The improvement in a radio-frequency welding apparatus of claim 15 in which said housing is set in a recess in said horn and has an external arcuate portion which completes the circular cross section of said horn.

18. In a radio-frequency welding apparatus having an induction coil, a horn about which opposite edge portions of continuous strip material are positioned for welding one to another and for supporting the bottom roll of a pair of forging rolls which cooperate in positioning the edge portions and cooperate to form a lap or blap-weld line between the edge portions of said material, and an impeder sleeve disposed about said horn and in contact therewith and extending from a plane in close proximity to the point of contact of the edge portions of the formed strip material to a plane spaced upstream from said coil at least a distance equal to the inside diameter of said coil, the improvement comprising a housing for said first forging roll constructed of a material having a high magnetic permeability and low electrical conductivity and a fluid cooled magnetic field intensity terminating block positioned at the upstream end of said impeder sleeve in a ring about said horn, and said block constructed of a material having high thermal and electrical conductivities and a low magnetic permeability.

19. The improvement in a radio-frequency welding apparatus of claim 18 in which the material of said housing is a mixture of powdered iron and a resinous binder in the weight ratio range of 5:1 to 10:1 and in which said terminating block material is a copper alloy having high copper content.

20. In a radio-frequency welding apparatus having an induction coil and a horn about which said edge portions of continuous strip material are positioned for welding one to another and for supporting the first of a pair of forging rolls and having a second cooperating forging roll for contacting the outer surface of the strip material and for acting together with said first roll of said forging roll pair to forge a line of weld, the improvement comprising a covering tube of a material having high magnetic permeability and low electrical conductivity disposed about said induction coil, said tube extending from a position immediately upstream from said second cooperaitng forging roll to a plane on the up-stream side of said induction coil, said tube having a notch in the downstream end thereof to accommodate eddy current flow in the "V" of the edge portions, and an impeder sleeve of a material having high magnetic permeability and low electrical conductivity disposed about said horn and in contact therewith and extending from a perpendicular plane in close proximity to the point of contact of the edge portions of the formed strip material to a plane spaced upstream of said coil a distance greater than the inside diameter of said coil, said impeder sleeve extending further upstream than the upstream end of said covering tube.

21. The improvement in a radio-frequency welding apparatus of claim 20 in which both said impeder sleeve and said covering tube are constructed of a sintered ceramic ferrite.

22. In a radio-frequency welding apparatus having an induction coil and a horn about which opposite edge portions of continuous strip material are positioned for welding one to another and for supporting the bottom roll of a pair of forging rolls, the improvement comprising an impeder sleeve of a material having high magnetic permeability and low electrical conductivity disposed about said horn and in supported contact therewith and disposed within the positioned strip material, said sleeve extending from a distance of at least one coil diameter upstream of said induction coil to a perpendicular plane in close proximity to the contact point of the converging edge portions of the strip material, and a fluid cooled magnetic field intensity terminating block positioned in contact with the upstream end of said valve, said terminating block constructed of a material having high electrical and thermal conductivities and competent to provide a heat sink between the upstream portion of said sleeve and said forming horn.

23. The improvement in a radio-frequency welding apparatus of claim 22 in which said sleeve consists of a plurality of abutting rings of the high magnetic permeability and low electrical conductivity material.

24. The improvement in a radio-frequency welding apparatus of claim 22 in which said impeder sleeve has a cross sectional area in a plane perpendicular to the longitudinal axis of said horn approximately 0.575 times the enclosed cross-sectional area of the positioned strip material.

25. The improvement in a radio-frequency welding apparatus of claim 22 in which said impeder sleeve is constructed of a sintered ceramic ferrite and in which said terminator block is constructed of a copper alloy having a high copper content.

26. In a radio-frequency welding apparatus having an induction coil and a horn about which opposite edge portions of continuous strip material are positioned for welding one to another and for supporting the bottom of a pair of forging rolls which cooperate in positioning the edge portions and forming a lap or blap weld line between the edge portions of said material, the improvement comprising an impeder sleeve of a material having high magnetic permeability and low electrical conductivity disposed around said horn and in supported contact therewith and disposed within the positioned strip material, said sleeve extending from a distance of at least one coil diameter upstream of said induction coil to a perpendicular plane in close proximity to the contact point of the converging edge portions of the strip material, and a fluid cooled magnetic field intensity terminating block positioned in contact with the upstream end of said sleeve, said terminating block constructed of a material having high electrical and thermal conductivities and component to provide a heat sink between the upstream portion of said sleeve and said forming horn.

27. A radio-frequency welding apparatus for positioning opposite edge portions of continuous strip material and for welding the same one to another comprising a forming horn rigidly positioned within the continuous strip material, a first forging roll rotatably housed in said horn and positioned immediately downstream of the point of contact of the edge portions of the formed strip material for contacting the inner surface, a second cooperating forging roll for contacting the outer surface of the strip material and for acting with said first roll to forge a line of weld, an impeder sleeve of a material having high magnetic permeability and low electrical conductivity disposed about said horn and in contact therewith, a radio-frequency induction coil disposed about the former strip material and having the downstream loop thereof spaced close to the downstream end of said impeder sleeve, said impeder sleeve extending from a perpendicular plane in close proximity to the point of contact of the edge portions of the formed strip material to a plane spaced upstream from the closest end of said coil at least a distance equal to the inside diameter of said coil, a fluid cooled magnetic field intensity terminator block positioned in a contact with the upstream end of said impeder sleeve and constructed of a material having high electrical and thermal conductivities and competent to provide a heat sink between the upstream portion of said sleeve and said horn.

28. The radio-frequency welding appartus of claim 27 in which said sleeve consists of a plurality of abutting removable rings.

29. The radio-frequency welding apparatus of claim 27 in which said impeder sleeve is constructed of sintered ceramic ferrite and in which said magnetic field intensity terminator block is constructed of a copper alloy having a high copper content.

30. The radio-frequency welding apparatus of claim 27 in which said first forging roll is housed in a housing constructed of a material having a high magnetic permeability and low electrical conductivity and said housing located wholly within said horn.

31. The radio-frequency welding apparatus of claim 30 in which said housing is constructed of a mixture of powdered iron and a resinous binder in the weight ratio range of 5:1 to 10:1.

32. In a radio-frequency welding apparatus having an induction coil, a horn about which opposite edge portions of continuous strip material are positioned for welding one to another and for supporting the first of a pair of forging rolls, a second cooperating forging roll for contacting the outer surface of the strip material and for acting together with said first roll to forge a line of weld; and an impeder sleeve disposed about said horn and in contact therewith and extending from a plane in close proximity to the point of contact of the edge portions of the formed strip material to a plane spaced upstream from said coil at least a distance equal to the inside diameter of said coil; the improvement comprising a covering tube of a material having high magnetic permeability and low electrical conductivity disposed about said induction coil, said covering tube extending from a position immediately upstream from said second cooperating forging roll to a plane on the upstream side of said induction coil, and said tube having a notch therein accommodating induced eddy current flow in the "V" of the edge portions, and a fluid cooled magnetic field intensity terminating block positioned at the upstream end of said sleeve impeder and positioned in a ring about said horn, and said block constructed of a material having a high thermal and electrical conductivity and a low magnetic permeability.

33. The improvement in a radio-frequency welding apparatus of claim 32 in which said covering tube is constructed of a sintered ceramic ferrite having high magnetic permeability and low electrical conductivity.

34. In a radio-frequency welding apparatus having an induction coil and a horn about which opposite edge portions of continuous strip material are positioned for welding one to another and for supporting the first of a pair of forging rolls, the improvement comprising an impeder sleeve of a material having a high magnetic permeability and low electrical conductivity disposed about said horn and in contact therewith, a radio-frequency induction coil disposed about the formed strip material and having the downstream loop thereof spaced close to the downstream end of said impeder sleeve, said impeder sleeve extending from a perpendicular plane in close proximity to the point of contact of the edge portions of the formed strip material to a plane spaced upstream from said coil a distance greater than the inside diameter of said coil, a fluid cooled magnetic field intensity terminator block positioned in contact with the upstream end of said impeder sleeve and constructed of a material having high electrical and thermal conductivities and competent to provide a heat sink between the upstream portion of said sleeve and said horn, and a housing for retaining said first forging roll constructed of a material having a high magnetic permeability and low electrical conductivity, said housing located wholly within said horn.

35. The improvement in a radio-frequency welding apparatus of claim 34 in which said impeder sleeve is constructed of a sintered ceramic ferrite and in which said fluid cooled terminator block is constructed of a copper alloy having a high copper content, and in which said housing is constructed of a mixture of powdered alpha-iron in a polyester resin in the weight proportion range of 5:1 to 10:1.

36. In a radio-frequency welding apparatus having an induction coil, a horn about which opposite edge portions of continuous strip material are positioned for welding one to another and for supporting the first of a pair of forging rolls, a second of the pair of forging rolls cooperating with said first roll for contacting the outer surface of the strip material and for acting in cooperation therewith to form a weld line, and an impeder sleeve disposed about said horn and in contact therewith and extending from a plane in close proximity to the point of contact of the edge portions of the formed strip material to a plane spaced upstream from said coil at least a distance equal to the inside diameter of said coil, the improvement comprising a covering tube of a material having high magnetic permeability and low electrical conductivity disposed about and contacting said induction coil, said tube extending from a position immediately upstream from said second cooperating forging roll to a plane on the upstream side of said induction coil, said covering tube having a notch therein for accommodating flow of induced eddy current in the "V" of the edge portions of the strip material, a fluid cooled magnetic field intensity terminating block positioned at the upstream end of said impeder sleeve and positioned in a ring about said horn, said block constructed of a material having high thermal and electrical conductivities, and a housing for the first of the pair of forging rolls located wholly within said horn and constructed of a material having high magnetic permeability and low electrical conductivity.

37. The improvement in a radio-frequency welding apparatus of claim 36 in which said covering tube is constructed of a sintered ceramic ferrite and in which said fluid cooled terminating block is constructed of a copper alloy having a high copper content, and in which said housing is constructed of a mixture of powdered alpha-iron and a polyester resin in the weight proportion range of 5:1 to 10:1.

38. The radio-frequency welding appartus of claim 27 in which said induction coil has disposed thereabout a covering tube of a material having high magnetic permeability and low electrical conductivity, said tube extending from a position immediately upstream from said second cooperating forging roll to a plane on the upstream side of said induction coil, and said tube having a notch therein for accommodating flow of induced eddy currents in the "V" of the edge portions.

39. The radio-frequency welding apparatus of claim 38 in which said covering tube is constructed of a sintered ceramic ferrite and in which said magnetic field intensity terminator block is constructed of a copper alloy having a high copper content.

40. In a radio-frequency welding apparatus having an induction coil and a horn about which opposite edge portions of continuous strip material are positioned for welding one to another and for supporting the bottom roll of a pair of forging rolls, the improvement comprising an impeder sleeve of a material having high magnetic permeability and low electrical conductivity disposed around said horn and in supported contact therewith, said impeder sleeve extending from a distance greater than one coil diameter upstream of said induction coil downstream to a perpendicular plane in close proximity to the contact point of the converging edge portions of the strip material, a housing for said first forging roll constructed of a material having a high magnetic permeability and low electrical conductivity, said housing located wholly within said horn, a covering tube of a material having high magnetic permeability and low electrical conductivity disposed about said induction coil, said covering tube extending from a position immediately upstream from said forging roll to a plane on the upstream side of said induction coil, and said tube having a notch therein at the downstream end for accommodating induced current flow in the edge portions of the strip material.

41. The improvement in a radio-frequency welding apparatus of claim 40 in which said impeder sleeve and said covering tube are constructed of a sintered ceramic ferrite and in which said housing for said first forging roll is constructed of a mixture of powdered iron and a polyester resin in the weight ratio range of 5:1 to 10:1.

42. A radio-frequency welding apparatus for positioning opposite edge portions of continuous strip material and for welding the same one to another, comprising a forming horn rigidly positioned within the continuous strip material, a first forging roll rotatably housed in said horn and positioned immediately downstream from the point of contact of the edge portions of the formed strip material, a second cooperating forging roll for contacting the outer surface of the strip material and for acting with said first roll to forge a line of weld, an impeder sleeve of a material having high magnetic permeability and low electrical conductivity disposed about said horn and in contact therewith, a radio-frequency induction coil disposed about the formed strip material and having the downstream loop thereof spaced close to the downstream end of said impeder sleeve, said impeder sleeve extending from a perpendicular plane in close proximity to the point of contact of the edge portions of the formed strip material to a plane spaced upstream from said coil at least a distance equal to the inside diameter of said coil, a fluid cooled magnetic field intensity terminator block positioned in contact with the upstream end of said impeder sleeve and constructed of a material having high electrical and thermal conductivities and competent to provide a heat sink between the upstream portion of said sleeve and said horn, a covering tube of a material having a high magnetic permeability and low electrical conductivities disposed about said induction coil, said covering tube extending from a position immediately upstream from said second cooperating forging roll to a plane on the upstream side of said induction coil, said covering tube having a notch therein to accommodate flow of induced eddy currents in the "V" of the edge portions, and a housing constructed of a material having a high magnetic permeability and low electrical conductivity for housing said first forging roll, said housing located wholly within said horn.

43. The radio-frequency welding apparatus of claim 42 in which said covering tube is constructed of a sintered ceramic ferrite.

44. The radio-frequency welding apparatus of claim 42 in which said impeder sleeve is constructed of a sintered ceramic ferrite.

45. The radio-frequency welding apparatus of claim 42 in which said fluid cooled terminator block is constructed of a copper alloy having a high copper content.

46. The radio-frequency welding apparatus of claim 42 in which said housing for said first forging roll is constructed of a mixture of powdered iron and a resinous binder in the weight ratio range of 5:1 to 10:1.

References Cited by the Examiner
UNITED STATES PATENTS

| | | | |
|---|---|---|---|
| 2,912,549 | 11/1959 | Dunn | 219—8.5 |
| 2,933,582 | 4/1960 | Tower | 219—8.5 |
| 3,072,771 | 1/1963 | Kennedy | 219—8.5 |

RICHARD M. WOOD, *Primary Examiner.*